US009294366B2

(12) United States Patent
Mahimkar et al.

(10) Patent No.: US 9,294,366 B2
(45) Date of Patent: Mar. 22, 2016

(54) METHOD AND APPARATUS FOR DETERMINING LOCALIZED SERVICE QUALITY IN A WIRELESS NETWORK

(71) Applicant: AT&T Intellectual Property I, L.P., Atlanta, GA (US)

(72) Inventors: Ajay Mahimkar, Woodbridge, NJ (US); Vaneet Aggarwal, Parsippany, NJ (US); Hongyao Ma, Somerville, MA (US); Walter Willinger, Madison, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 132 days.

(21) Appl. No.: 14/092,851

(22) Filed: Nov. 27, 2013

(65) Prior Publication Data

US 2015/0146555 A1     May 28, 2015

(51) Int. Cl.
| | |
|---|---|
| *H04L 12/26* | (2006.01) |
| *H04L 12/24* | (2006.01) |
| *H04W 24/08* | (2009.01) |
| *H04W 24/10* | (2009.01) |

(52) U.S. Cl.
CPC ............ *H04L 41/5009* (2013.01); *H04L 43/12* (2013.01); *H04W 24/08* (2013.01); *H04W 24/10* (2013.01)

(58) Field of Classification Search
CPC ...................................................... H04L 43/12
See application file for complete search history.

(56) References Cited

U.S. PATENT DOCUMENTS

| | | | |
|---|---|---|---|
| 6,909,741 B1 | 6/2005 | Smith et al. | |
| 7,516,048 B2 | 4/2009 | Grigorgiu et al. | |
| 8,073,795 B2 | 12/2011 | Honisch | |
| 8,553,526 B2 | 10/2013 | Maylan et al. | |
| 2010/0222081 A1 | 9/2010 | Ward et al. | |
| 2012/0215893 A1 | 8/2012 | Bisdikian et al. | |
| 2013/0028114 A1 | 1/2013 | Gutierrez, Jr. et al. | |
| 2013/0031120 A1* | 1/2013 | Passani et al. | 707/758 |
| 2013/0117842 A1* | 5/2013 | Kakadia et al. | 726/22 |
| 2013/0138816 A1 | 5/2013 | Kuo et al. | |
| 2015/0149613 A1* | 5/2015 | Kakadia et al. | H04L 43/04 |

OTHER PUBLICATIONS

Gupta, Sandeep KS. "1 Research Accomplishments in Wireless Networks and Mobile Computing." http://citeseerx.ist.psu.edu/viewdoc/download?doi=10.1.1.35.5553&rep=rep1&type=pdf.

* cited by examiner

*Primary Examiner* — John Blanton

(57) ABSTRACT

A method, computer-readable storage device, and an apparatus for determining a localized service quality in a wireless network are disclosed. For example, the method constructs a tensor comprising a plurality of dimensions to represent data for the localized service quality, receives data for the wireless network that is gathered at a coarse granularity level, populates the tensor in accordance with the data that is gathered, applies an unfolding mechanism to construct a plurality of two dimensional matrices from the tensor, determines for each respective two dimensional matrix of the plurality of two dimensional matrices an approximation for a pre-determined level of accuracy, and populating all entries of each respective two dimensional matrix that are not populated in accordance with the approximation of the respective two dimensional matrix, and determines the localized service quality by applying a folding mechanism across the plurality of two dimensional matrices.

18 Claims, 3 Drawing Sheets

METHOD AND APPARATUS FOR DETERMINING LOCALIZED SERVICE QUALITY IN A WIRELESS NETWORK

BACKGROUND

A customer's ability to access wireless services and to be satisfied with the services that are provided by a network service provider, e.g., a wireless service provider, is dependent on the quality of the services. The quality of the services experienced by customers depends on how well the wireless network is maintained. The maintenance of the wireless network may be based on an analysis of data collected on failures and degradations in the network. However, collecting such data across the entire network imposes tremendous requirements on processing power. Thus, analysis based on knowledge of every failure and degradation situation in the network is not practical or feasible.

SUMMARY OF THE DISCLOSURE

In one embodiment, the present disclosure describes a method, computer-readable storage device, and an apparatus for determining a localized service quality in a wireless network. For example, the method constructs a tensor comprising a plurality of dimensions to represent data for the localized service quality in the wireless network, receives data for the wireless network that is gathered at a coarse granularity level, populates the tensor in accordance with the data that is gathered at the coarse granularity level, applies an unfolding mechanism to construct a plurality of two dimensional matrices from the tensor, determines for each respective two dimensional matrix of the plurality of two dimensional matrices that is constructed an approximation for a pre-determined level of accuracy, and populating all entries of each respective two dimensional matrix that are not populated in accordance with the approximation of the respective two dimensional matrix, and determines, via the processor, the localized service quality by applying a folding mechanism across the plurality of two dimensional matrices.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly describes a method, computer-readable storage device, and apparatus for determining a localized service quality in a wireless network. Although the teachings of the present disclosure are discussed below in the context of a long term evolution (LTE) based wireless network, the teaching is not so limited. Namely, the teachings of the present disclosure can be applied for other types of wireless networks (e.g., 2G network, 3G network, 4G network and the like), wherein the user endpoint devices are mobile and are to be tracked.

Broadly defined, 3GPP is a global effort to define a wireless communication system specification. 2G is a second generation cellular network technology, 3G is a third generation cellular network technology, and 4G is a fourth generation cellular network technology. A Global System for Mobile (GSM) communications is an example of a 2G cellular technology and a Universal Mobile Telecommunications System (UMTS) is an example of a 3G cellular network technology. In accordance with the 3GPP global effort, a General Packet Radio Service (GPRS) refers to a communications service used to transfer data via a cellular network. GPRS is available to users of a 2G cellular system GSM. The GPRS provides an enhancement to the GSM system so that data packets are supported. In addition, in 3GPP release 8, an LTE is provided as a set of enhancements to the UMTS. The enhancement focuses on adopting 4th Generation (4G) mobile communications technology to include an all Internet Protocol (IP) end-to-end networking architecture. An LTE is an example of a 4G cellular network technology.

A base station for a 2G network is also referred to as a base transceiver station (BTS). A base station in a 3G network is also referred to as a Node B. For the 4G network, a radio base transceiver station (RBS), as per the 3GPP standards, is referred to as an eNodeB (or simply as a base station). An eNodeB provides an LTE—air interface and performs radio resource management for wireless access.

In one embodiment, a Serving GPRS Support Node (SGSN) refers to a network node responsible for communicating with user endpoint devices and routing of data calls. For example, the SGSN may send and receive data packets to and from user endpoint devices in the coverage area of the SGSN.

In one embodiment, a Gateway GPRS Support Node (GGSN) refers to a network node responsible for the interworking between the GPRS network and external packet switched networks, e.g., the Internet. The GGSN converts the GPRS packets coming from the SGSN into the packet data protocol (PDP) format of the external packet network. For example, the GPRS packet may be converted to an Internet Protocol packet prior to being sent to the external network, which is Internet Protocol based.

Figure 1:
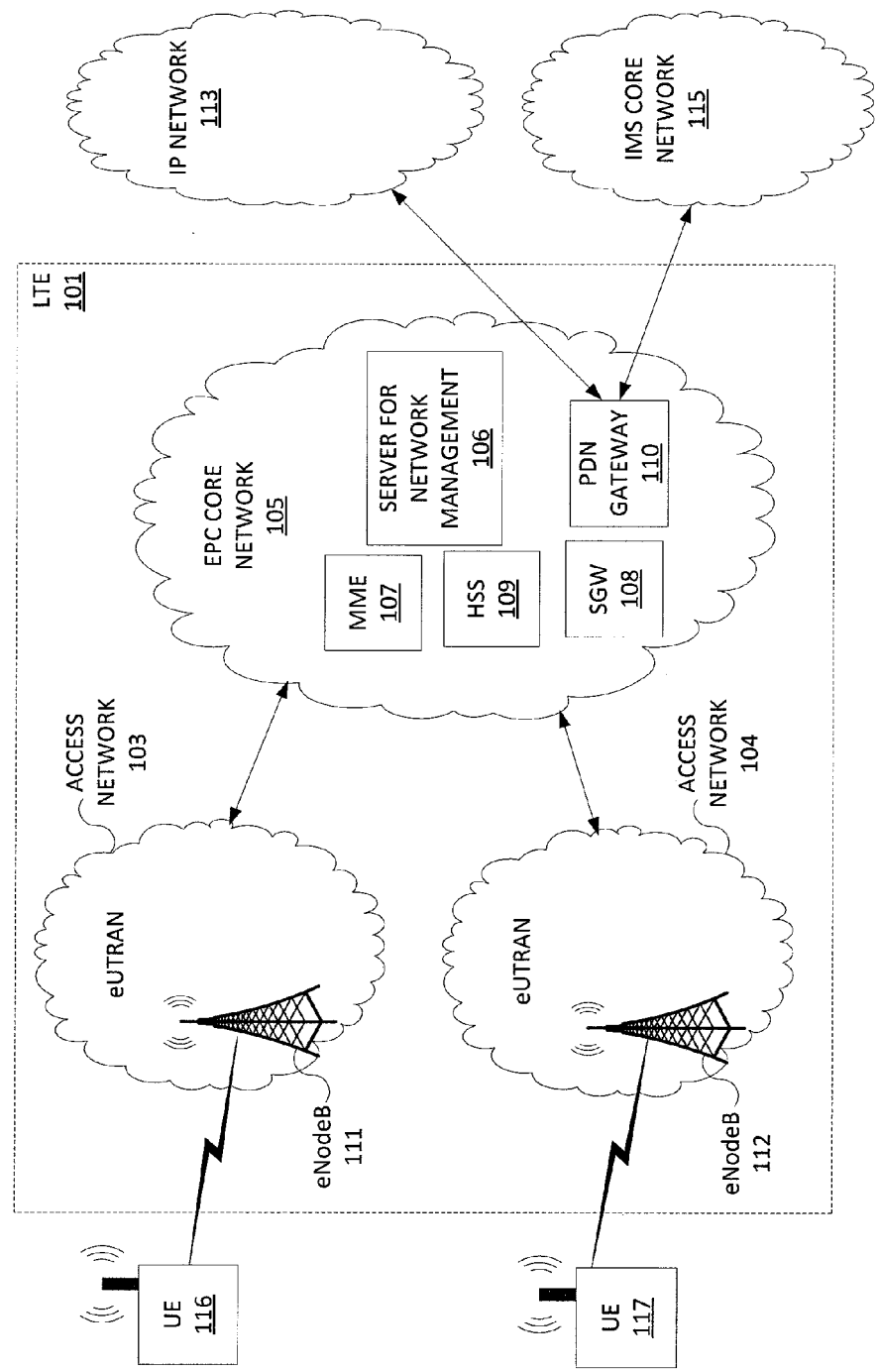
FIG. 1 illustrates an exemplary network related to the present disclosure.

FIG. 1 illustrates an exemplary network 100 related to the present disclosure. In one illustrative embodiment, the network 100 comprises an LTE network 101, an IP network 113, and a core network, e.g., an IMS core network 115. FIG. 1 also illustrates various user endpoint devices, e.g., LTE user endpoint devices 116 and 117. The user endpoint devices 116 and 117 can be a smart phone, a cellular phone, a computer or laptop, a computing tablet, or any endpoint communication devices equipped with wireless capabilities.

In one illustrative embodiment, the LTE network 101 comprises access networks 103 and 104 and a core network 105. In one example, each of the access networks 103 and 104 comprises an evolved Universal Terrestrial Radio Access Network (eUTRAN). In one example, the core network 105 comprises an Evolved Packet Core (EPC) network.

The eUTRANs are the air interfaces of the 3GPP's LTE specifications for mobile networks. Namely, the eUTRAN comprises a radio access network standard that will replace previous generations of air interface standards. All eNodeBs in the eUTRANs 103 and 104 are in communication with the EPC network 105. In operation, LTE user equipment or user endpoints (UE) 116 may access wireless services via the eNodeB 111 located in the eUTRAN 103. Similarly, the LTE UE 117 may access wireless services via the eNodeB 112 located in the eUTRAN 104.

It should be noted that any number of eNodeBs can be deployed in an eUTRAN. In one illustrative example, the eUTRANs 103 and 104 may comprise one or more eNodeBs.

An EPC network provides various functions that support wireless services in the LTE environment. In one embodiment, an EPC network is an Internet Protocol (IP) packet core network that supports both real-time and non-real-time service delivery across a LTE network, e.g., as specified by the 3GPP standards.

In EPC network 105, a server for network management 106, a network device Mobility Management Entity (MME) 107, and a Serving Gateway (SGW) 108, support various functions as part of the LTE network 101. For example, the server for network management 106 performs analysis of network data to determine a quality of service experienced by customers. The MME 107 is the control node for the LTE access-network. In one embodiment, it is responsible for UE (User Equipment) tracking and paging (e.g., such as retransmissions), bearer activation and deactivation process, selection of the SGW, and authentication of a user. In one embodiment, SGW 108 routes and forwards user data packets, while also acting as the mobility anchor for the user plane during inter-eNodeB handovers and as the anchor for mobility between LTE and other wireless technologies, such as 2G and 3G wireless networks.

In addition, EPC (common backbone) network 105 may comprise a Home Subscriber Server (HSS) 109 that contains subscription-related information (e.g., subscriber profiles), performs authentication and authorization of a wireless service user, and provides information about the subscriber's location. The EPC network 105 may also comprise a public data network gateway 110 which serves as a gateway that provides access between the EPC network 105 and various data networks, e.g., other IP networks 113, an IMS core network 115, a network management system and the like. The public data network (PDN) gateway is also referred to as a PDN gateway, a PDN GW or a PGW.

It should be noted that although various networks are shown as separate networks in FIG. 1, it is possible that functions performed by these networks can be combined into fewer networks or expanded into a greater number of networks depending on the deployment requirements.

It should also be noted that the above illustrated network 100 is only illustrative and the number of network components or elements are not specifically limited as shown. Any number of network components or elements can be deployed.

The quality of the service experienced by customers depends on maintenance of the network performed by the service provider. In order to determine where and when maintenance or upgrade is needed and to perform network planning, the service provider performs an analysis on performance data that is collected. For example, the service provider may collect data on network troubles, such as network failures and degradations, congestion, throughput, etc. The performance data that is collected may be used for several purposes. For example, the data may be analyzed and used for diagnosing network troubles, determining impacts of network troubles, for network planning (e.g., capacity, coverage, expansion, upgrade, etc.), for performing load balancing, for optimizing usage of network resources, etc.

Depending on the purpose of the analysis, different types and granularity levels of network performance data are needed. Data of a coarse granularity level may be collected using spatial and/or temporal models. For example, performance data may be gathered from network elements every 15 minutes, every hour, etc. However, if the analysis is for determining the quality of service experienced by each customer (each end user), the performance data may comprise causes for each dropped call, degraded call, etc. For example, the cause may specify one or more of: a failure related to a soft handover, a failure related to a hard handover, a failure related to radio interference, a failure related to radio links, a failure related to switching of channels, a failure related to an expiration of a protocol timer, and so on. Data that is collected at such detailed level may be referred to as a fine-grained measurement or a localized service quality measurement. In one embodiment, the fine-grained measurement data of the wireless network comprises: General Performance Event Handling (GPEH) data, Carrier IQ (CIQ) data, Mark The Spot (MTS) data collected from user endpoint devices, Network Event Location System (NELOS) based estimates, drive tests, etc. However, collecting a detailed cause for each dropped call across the entire network, at all times, would require unlimited processing power and is very costly.

In one embodiment, the method of the present disclosure provides the localized service quality measurement from data gathered using the coarse granularity level. The data gathered using the coarse granularity level may also be referred to as coarse-grained information. The coarse-grained information comprises information that has both spatial and temporal components. The method then uses a statistical technique to infer the missing fine-grained information.

The statistical technique is implemented using multi-dimensional matrices to represent the data. The multi-dimensional matrices may also be referred to as tensors. The entries of the tensor would be populated if the fine-grained information was available. However, since the data that is gathered comprises only the coarse-grained information, some entries are missing in the tensor. For example, the coarse-grained information about the status of calls may be collected from cell towers in a pre-determined interval, e.g., every 15 minutes. However, the detailed reason for each termination of call may not be gathered. The method of the present disclosure uses tensor completion techniques to fill-in the entries that are missing. For instance, information close in space or location, close in time, or close in other service quality indicators may be used to estimate values for missing entries in the tensor.

As described above, the method of the present disclosure uses tensors to represent the data. The method then first constructs the tensor. In one embodiment, dimensions of the tensor comprise:
  (i) Spatial locations of network equipment;
  (ii) Sequences of times in a pre-determined granularity;
  (iii) Key Performance Indicators (KPIs) of service quality;
  (iv) Types of user endpoint devices (user devices); and
  (v) Models of user endpoint devices.

The spatial locations of network equipment may comprise locations and identifications of network equipment such as: cell towers, mobile switching centers, base station or radio network controllers, etc. The sequences of times in the pre-determined granularity may comprise time frames in intervals, e.g., every 15 minutes, every hour, every day, etc. The KPIs of service quality may comprise: a number of dropped voice calls, data throughput rate, a number of successful attempts by a protocol for a radio resource control, total numbers of calls, types of calls (e.g., voice, data, multimedia), etc. The types of user endpoint devices may comprise types of devices such as Apple® devices, Samsung® devices, Motorola® devices, etc. The models of the user endpoint devices may comprise a model for each type of device. For example, the models for Apple® devices may comprise: an iPhone4® model, an iPhone5® model, etc.

The present method applies an unfolding mechanism to construct a plurality of two dimensional matrices from the tensor. Since the tensor had missing entries, any number of entries in the plurality of two dimensional matrices would also be missing.

For each two dimensional matrix, the method then determines an approximation for a pre-determined level of accuracy and fills all missing entries of the two dimensional matrix in accordance with the respective approximation. Typically, operational network data has a high degree of dependency across multiple dimensions. Thus, each of the two dimensional matrices can be approximated using low rank. The term "low rank" refers to a characteristic that indicates that a number of dimensions needed to get a pre-determined level of accuracy being a number that is low. In order to determine the approximation for a particular matrix, the method first identifies all Eigen values of the particular matrix using singular value decomposition. Since the data has a high degree of dependency, the majority of information is concentrated in the first few singular values (i.e., low rank). The method then applies a threshold to select a first few Eigen vectors for the particular matrix in accordance with the pre-determined level of accuracy, wherein the first few Eigen vectors that are selected are the Eigen vectors that are associated with the first few singular values. For example, the Eigen vectors with maximum concentration of information are selected. The method then fills all missing entries for the particular matrix in accordance with the first few Eigen vectors that are selected for the particular matrix.

The method then applies a folding mechanism across the plurality of two dimensional matrices to obtain the localized service quality, i.e., the fine-grained information. Since missing entries in each of the plurality of the two dimensional matrices have been filled, the tensor that is constructed by applying the folding mechanism contains information across all dimensions.

The method may then analyze the tensor with the fine-grained information and use the result of the analysis for several purposes, e.g., for diagnosing network troubles, for determining impacts of network troubles, for network planning, for performing load balancing, for optimizing usage of network resources, etc.

Figure 2:
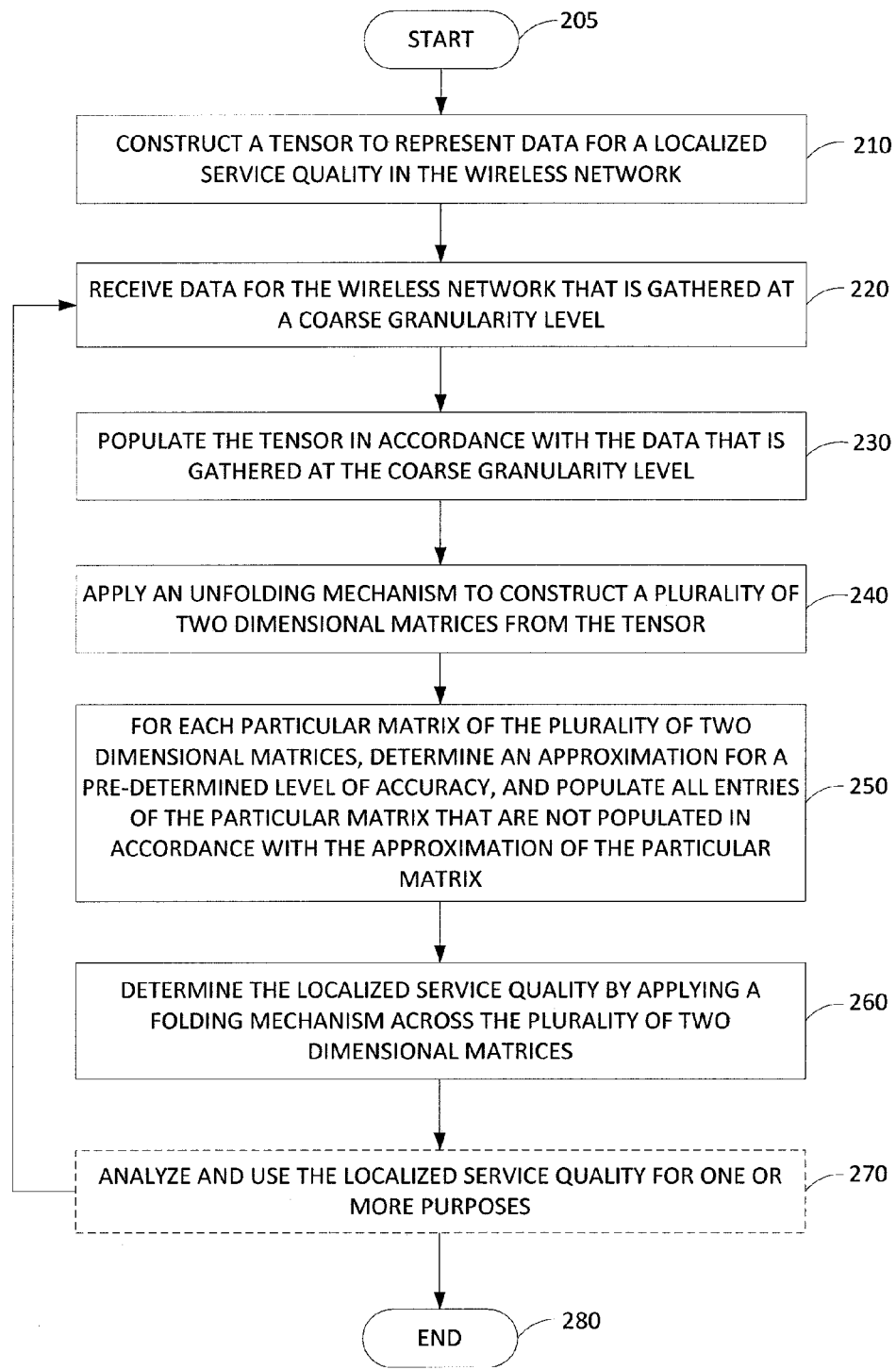
FIG. 2 illustrates a flowchart of a method for determining a localized service quality in a wireless network.

FIG. 2 illustrates a flowchart of a method 200 for providing or inferring a localized service quality in a wireless network. In one embodiment, the method may be implemented in a server, e.g., an application server such as a server used for network management or a general purpose computer as discussed in FIG. 3. Method 200 starts in step 205 and proceeds to step 210.

In step 210, method 200 constructs a tensor of a plurality of dimensions to represent data for a localized service quality in the wireless network. For example, the method constructs a tensor to represent data at a fine granularity level for the wireless network.

In one embodiment, the plurality of dimensions of the tensor comprise:
 (i) a dimension for spatial locations of network equipment;
 (ii) a dimension for a sequence of times in a pre-determined granularity;
 (iii) a dimension for Key Performance Indicators (KPIs) of service quality;
 (iv) a dimension for types of user endpoint devices (user devices); and
 (v) a dimension for models of user endpoint devices.

In step 220, method 200 receives data for the wireless network that is gathered at a coarse granularity level. For example, network performance data may be gathered from various network elements every 15 minutes, every hour, etc.

In step 230, method 200 populates the tensor in accordance with the data that is gathered at the coarse granularity level. The data that is gathered at the coarse granularity level has both spatial and temporal components. Since the data that is gathered comprises only the data gathered at a coarse granularity level, and the tensor is constructed for the fine granularity level, some entries in the tensor are missing (i.e., not populated).

In step 240, method 200 applies an unfolding mechanism on the tensor onto each dimension of the plurality of dimensions to construct a plurality of two dimensional matrices from the tensor. Since the tensor had missing entries, any number of entries in a particular two dimensional matrix of the plurality of two dimensional matrices may be missing values (i.e., may not be populated). The unfolding of the tensor onto a particular dimension makes the particular dimension the first dimension. Then, other dimensions follow cyclically. Methods for unfolding tensors may be performed, as known in the art. For example, a Matlab toolbox from MathWorks Corporation of Natick, Mass. may be used to perform the unfolding and folding functions.

In step 250, for each particular two dimensional matrix of the plurality of two dimensional matrices that is constructed, method 200 determines an approximation for a pre-determined level of accuracy, and populates all entries of the particular two dimensional matrix that are not populated in accordance with the approximation of the particular matrix. For example, each entry of the particular two dimensional matrix that is not populated in step 230, is populated in accordance with the approximation of the particular two dimensional matrix.

In one embodiment, the determining of the approximation for the pre-determined level of accuracy for a particular two dimensional matrix of the plurality of two dimensional matrices comprises: identifying all Eigen values of the particular two dimensional matrix using singular value decomposition, determining the approximation by applying a threshold and selecting a first number of Eigen vectors of the particular two dimensional matrix in accordance with the pre-determined level of accuracy. In one embodiment, the first set of Eigen vectors that is selected comprises Eigen vectors with a highest concentration of information. For example, the majority of information may be concentrated in 1-3 singular values and the approximation may be based on 1-3 Eigen vectors. In one embodiment, the determining of the approximation for the particular two dimensional matrix is performed by applying a shrinkage operator. The shrinkage operator may be applied as known in the art. For example, Jian-Feng Cai, Emmanuel J. Candes, and Zuowei Shen, "*A Singular Value Thresholding Algorithm for Matrix Completion*", SIAM J. Optim., 20(4), 1956-1982 provides one method of determining the approximation by applying the shrinkage operator.

In step 260, method 200 determines the localized service quality by applying a folding mechanism across the plurality of two dimensional matrices after all entries of the plurality of two dimensional matrices have been populated. For example, since all entries in each of the plurality of the two dimensional matrices have been populated either in step 230 or step 250, the tensor that is constructed by applying the folding mechanism contains information across all dimensions that may be used for assessing localized service quality.

In optional step 270, method 200 analyzes and uses the localized service quality for one or more purposes. In one embodiment, the one or more purposes comprise at least one of: for diagnosing network troubles, for determining impacts of network troubles, for network planning, for performing load balancing, and for optimizing usage of network resources. For example, the method may analyze the localized service quality, which is now at a fine granularity level, and use the result for network planning and maintenance purposes. The method then either proceeds to step 280 to end processing the current determination of localized service quality, or returns to step 220.

Figure 3:
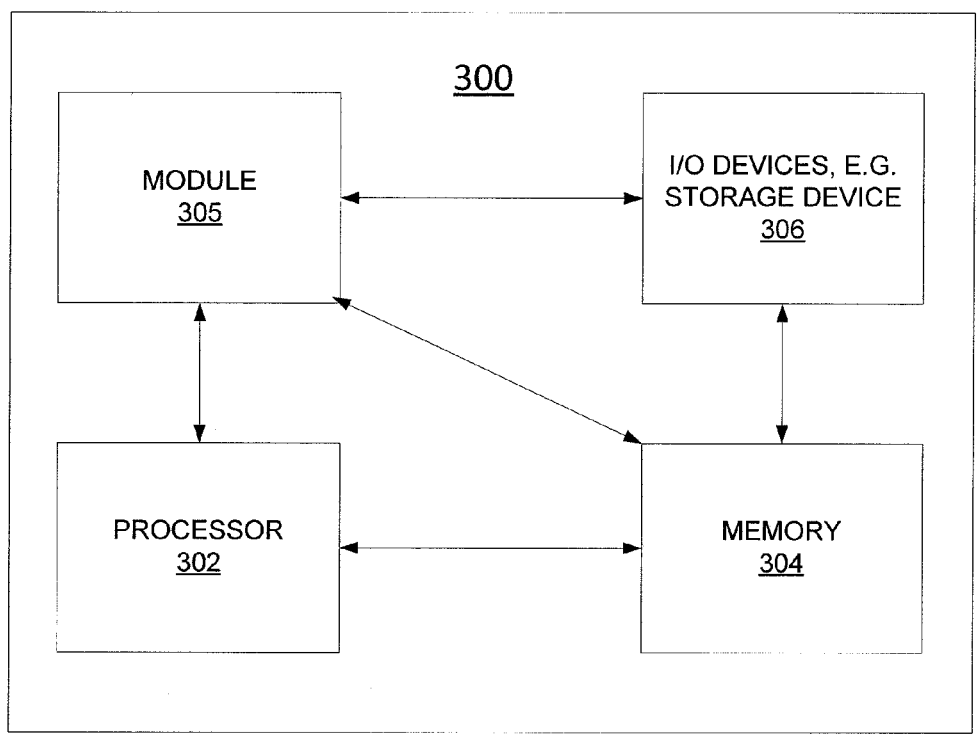
FIG. 3 depicts a high-level block diagram of a general-purpose computer suitable for use in performing the functions described herein.

FIG. 3 depicts a high-level block diagram of a general-purpose computer suitable for use in performing the functions described herein. As depicted in FIG. 3, the system 300 comprises one or more hardware processor elements 302 (e.g., a central processing unit (CPU), a microprocessor, or a multi-core processor), a memory 304, e.g., random access memory (RAM) and/or read only memory (ROM), a module 305 for providing a localized service quality in a wireless network, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the general-purpose computer may employ a plurality of processor elements. Furthermore, although only one general-purpose computer is shown in the figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 305 for providing a localized service quality in a wireless network (e.g., a software program comprising computer-executable instructions) can be loaded into memory 304 and executed by hardware processor element 302 to implement the steps, functions or operations as discussed above in connection with the exemplary method 200. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for providing a localized service quality in a wireless network (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A method for determining a localized service quality in a wireless network, the method comprising:
   constructing, via a processor, a tensor comprising a plurality of dimensions to represent data for the localized service quality in the wireless network;
   receiving, via the processor, data for the wireless network that is gathered at a coarse granularity level;
   populating, via the processor, the tensor in accordance with the data that is gathered at the coarse granularity level;
   applying, via the processor, an unfolding mechanism to construct a plurality of two dimensional matrices from the tensor;
   determining, via the processor, for each respective two dimensional matrix of the plurality of two dimensional matrices that is constructed an approximation for a pre-determined level of accuracy, and populating all entries of each respective two dimensional matrix that are not populated in accordance with the approximation of the respective two dimensional matrix, wherein the determining of the approximation for the pre-determined level of accuracy for a respective matrix of the plurality of two dimensional matrices comprises:
      identifying all Eigen values of the respective matrix using singular value decomposition and determining the approximation by applying a threshold; and
      selecting a first number of Eigen vectors in accordance with the pre-determined level of accuracy; and
   determining, via the processor, the localized service quality by applying a folding mechanism across the plurality of two dimensional matrices.

2. The method of claim 1, wherein a dimension of the tensor comprises a dimension for spatial locations of network equipment.

3. The method of claim 1, wherein a dimension of the tensor comprises a dimension for a sequence of times.

4. The method of claim 3, wherein the sequence of times is in accordance with a pre-determined granularity.

5. The method of claim 1, wherein a dimension of the tensor comprises a dimension for key performance indicators of service quality.

6. The method of claim 1, wherein a dimension of the tensor comprises a dimension for types of user endpoint devices.

7. The method of claim 1, wherein a dimension of the tensor comprises a dimension for indicating models of user endpoint devices.

8. The method of claim 1, wherein a first number of Eigen vectors that is selected comprises Eigen vectors with a highest concentration of information.

9. The method of claim 1, further comprising:
using the localized service quality for a purpose.

10. The method of claim 9, wherein the purpose comprises at least one of: diagnosing a network trouble, determining an impact of a network trouble, network planning, performing load balancing, and optimizing a usage of a network resource.

11. A computer-readable storage device storing a plurality of instructions which, when executed by a processor, cause the processor to perform operations for determining a localized service quality in a wireless network, the operations comprising:
constructing a tensor comprising a plurality of dimensions to represent data for the localized service quality in the wireless network;
receiving data for the wireless network that is gathered at a coarse granularity level;
populating the tensor in accordance with the data that is gathered at the coarse granularity level;
applying an unfolding mechanism to construct a plurality of two dimensional matrices from the tensor;
determining for each respective two dimensional matrix of the plurality of two dimensional matrices that is constructed an approximation for a pre-determined level of accuracy, and populating all entries of each respective two dimensional matrix that are not populated in accordance with the approximation of the respective two dimensional matrix, wherein the determining of the approximation for the pre-determined level of accuracy for a respective matrix of the plurality of two dimensional matrices comprises:
identifying all Eigen values of the respective matrix using singular value decomposition and determining the approximation by applying a threshold; and
selecting a first number of Eigen vectors in accordance with the pre-determined level of accuracy; and
determining the localized service quality by applying a folding mechanism across the plurality of two dimensional matrices.

12. The computer-readable storage device of claim 11, wherein a dimension of the tensor comprises a dimension for spatial locations of network equipment.

13. The computer-readable storage device of claim 11, wherein a dimension of the tensor comprises a dimension for a sequence of times.

14. The computer-readable storage device of claim 13, wherein the sequence of times is in accordance with a pre-determined granularity.

15. The computer-readable storage device of claim 11, wherein a dimension of the tensor comprises a dimension for key performance indicators of service quality.

16. The computer-readable storage device of claim 11, wherein a dimension of the tensor comprises a dimension for types of user endpoint devices.

17. The computer-readable storage device of claim 11, wherein a dimension of the tensor comprises a dimension for indicating models of user endpoint devices.

18. An apparatus for determining a localized service quality in a wireless network, the apparatus comprising:
a processor; and
a computer-readable storage device storing a plurality of instructions which, when executed by the processor, cause the processor to perform operations, the operations comprising:
constructing a tensor comprising a plurality of dimensions to represent data for the localized service quality in the wireless network;
receiving data for the wireless network that is gathered at a coarse granularity level;
populating the tensor in accordance with the data that is gathered at the coarse granularity level;
applying an unfolding mechanism to construct a plurality of two dimensional matrices from the tensor;
determining for each respective two dimensional matrix of the plurality of two dimensional matrices that is constructed an approximation for a pre-determined level of accuracy, and populating all entries of each respective two dimensional matrix that are not populated in accordance with the approximation of the respective two dimensional matrix, wherein the determining of the approximation for the pre-determined level of accuracy for a respective matrix of the plurality of two dimensional matrices comprises:
identifying all Eigen values of the respective matrix using singular value decomposition and determining the approximation by applying a threshold; and
selecting a first number of Eigen vectors in accordance with the pre-determined level of accuracy; and
determining the localized service quality by applying a folding mechanism across the plurality of two dimensional matrices.

* * * * *